Jan. 16, 1968 HIROSHI SATO ETAL 3,364,334
METHOD AND APPARATUS FOR ARC WELDING
Filed Oct. 19, 1966 2 Sheets-Sheet 1

INVENTORS
HIROSHI SATO
HIROYUKI FUJIWARA

BY

ATTORNEY

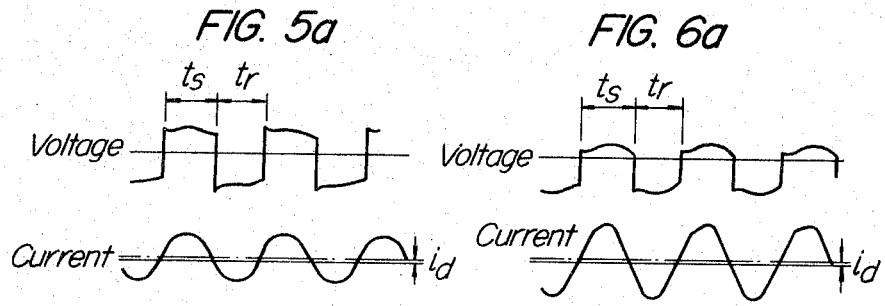
$t_s$: Straight polarity half wave
$t_r$: Reversed polarity half wave
$i_d$: DC component of current
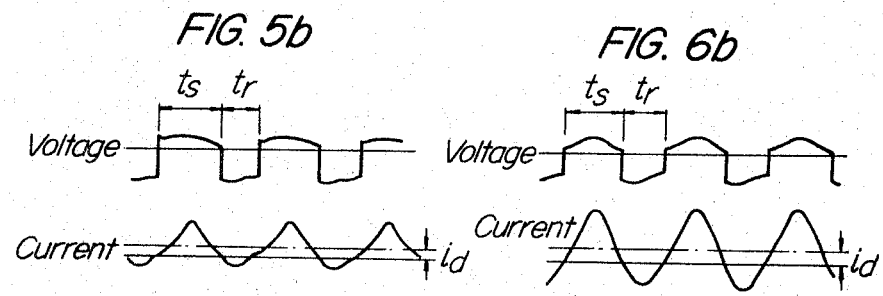
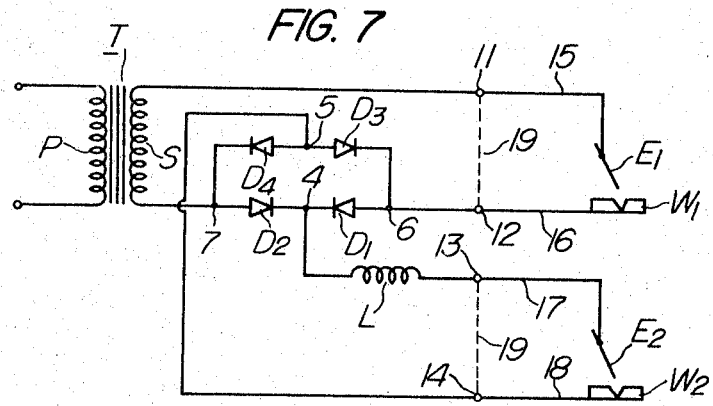
INVENTORS
HIROSHI SATO
HIROYUKI FUJIWARA
ATTORNEY United States Patent Office 3,364,334
Patented Jan. 16, 1968

3,364,334
METHOD AND APPARATUS FOR ARC WELDING
Hiroshi Sato and Hiroyuki Fujiwara, Tokyo, Japan, assignors to Hitachi, Ltd., Tokyo, Japan, a corporation of Japan
Filed Oct. 19, 1966, Ser. No. 587,743
5 Claims. (Cl. 219—131)

ABSTRACT OF THE DISCLOSURE

A method and apparatus for arc welding is described in which an AC arc is produced between a welding electrode and a work piece. The invention is characterized by providing a current wave form converter comprising a bridge type full wave rectifier connected with its AC side terminals in series with the welding current circuit. An inductive reactor is connected between the DC side terminals of the bridge rectifier so that the welding current for sustaining the AC welding arc is supplied through the current wave form converter including the reactor. As a result the wave form of the welding current is shaped by the reactor to provide a square wave form or a wave form approximate to a square wave which has a lower crest value than that of a comparable magnitude sine wave and a large current charging rate in the vicinity of the null instantaneous current value.

This invention relates to an improvement of a method and apparatus for effecting arc welding.

In effecting arc welding, the stability of arc is an important factor which will greatly affect the easiness of the operation and the quality of the welding results. Accordingly, an AC arc is essentially inferior to a DC arc with respect to the stability of the arc, since the phase of the arc current of an AC arc is reversed every half cycle of the AC voltage, whereby the instantaneous value of the arc current becomes zero twice during each one cycle. Especially, in the case of welding where a stable arc is required such as welding of thin plates, special steels, or non-ferrous metals, a DC arc is used more frequently. In the AC arc, however, there are no air blow phenomena which may be proper to the DC arc. Thus, the AC arc is suitable for welding using a relatively large current. Furthermore, in the welding of light metals such as aluminum or magnesium or light alloys where their oxide films may be produced more easily, the AC arc which has the so-called cleaning action destroying the oxide films must be used.

It is an object of the present invention to provide a method and apparatus for an AC arc welding or, more particularly, for an AC arc welding using a fusible electrode, in which the stability of the arc is enhanced by improving the wave form of the welding current so as to decrease the rearcing voltage after phase reversals, while sputtering is suppressed to enhance the fusing efficiency of transferred metals from the electrode to a matrix, and, furthermore, homogeneous welding is enabled by stabilizing the arc.

It is another object of the present invention to provide a method and apparatus for effecting AC arc welding of light metals or light alloys employing a non-consumable electrode in which a DC component (asymmetrical component) of the welding current is decreased so that a stable arc having a good cleaning action for the work piece can be produced.

It is still another object of the present invention to provide an apparatus for effecting arc welding with both AC and DC outputs which may be adapted to be used in various applications and which is capable of producing a stable arc with little sputtering when the apparatus is used as an AC welder, while a DC output with little pulsation is obtainable when the apparatus is used as a DC arc welder.

The invention will now be described in detail with reference to the accompanying drawings, in which:

FIGS. 5 and 6 show a comparison of voltage and current wave form diagrams when the AC arc welding of aluminum is performed by using the apparatus of the invention and the conventional apparatus with non-consumable electrode; and FIG. 7 is a circuit connection diagram showing another embodiment of the apparatus according to the present invention.

In general, AC arc welding is inferior to DC arc welding with respect to the stability of the arc. Furthermore, when a fusible electrode is used, AC arc welding has another drawback that sputtering is more easily producible.

According to the present invention, however, it has been found that, in AC arc welding, these drawbacks may be greatly improved by converting a sine wave form of the welding current which has been used heretofore into a square wave form or other wave form closely approximate to the square wave which has a lower crest factor relative to the sine wave and which has a large current changing rate in the vicinity of the null instantaneous value.

Figure 1:
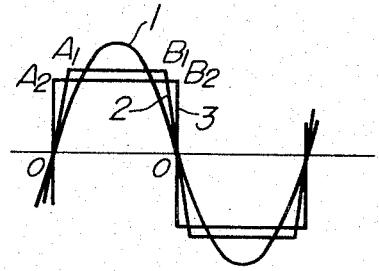
FIG. 1 is a current wave form diagram illustrating the characteristic features of the present invention.

In FIG. 1, the reference numeral 1 designates a current wave form of the sine wave form which has heretofore been used, the numerals 2 and 3 designate current wave forms which will be used in the present invention and are illustrated abstractly. It is assumed that these wave forms have the same effective value so that the same heat quantity may be produced during a half cycle.

When the wave form of the welding current is a sine wave like form such as shown at 1, it becomes difficult to sustain the arc thermally in the vicinity of the null instantaneous value due to the relatively small current instantaneous value and the relatively small thermal quantity produced by the arc just before and after the phase reversal of the current. Thus, a high voltage is required for rearcing after the phase reversal, while the thermal quantity which may be produced in the vicinity of the maximum current values would become excessively large so that sputtering would become more easily producible. In contrast to this, when the current wave form of low crest factor, such as the wave forms 2 or 3 in FIG. 1, for example a trapezoidal wave 2 in FIG. 1, is used, the integrated values of the currents between O and $A_1$ before the phase reversal and between $B_1$ and O after the phase reversal are always larger than that of the sine wave and the heat quantities produced by the trapezoidal wave during these periods are also larger than that of the sine wave. Thus, the arc is more easily sustainable so that a lower rearcing voltage after the phase reversal may be sufficient, while the crest value of the current is lowered relative to that of the sine wave so that, in the case of the trapezoidal wave 2, there is no change in the instantaneous value of the current, thus the heat quantity produced during a unit period of time is constant between $A_1$ and $B_1$ and the peak value of the heat quantity produced is lowered relative to the case of the sine wave. Thus, both the arc is made more stable and sputtering is suppressed so as to enhance the fusing efficiency of the transferred metal. These tendencies become more remarkable when the current wave form approximates the square wave form such as shown at 3 in FIG. 1. In the case of the square wave, only the phase reversal of the current takes place for each half cycle and the instantaneous value of the current is maintained constantly during the half cycle $A_2$–$B_2$. Thus, the resultant arc is quite stable as in the case of the DC arc and sputtering is more suppressed relative to the case of the sine wave, since the peak value of the produced heat quantity is sufficient lowered relative to the case of the sine wave.

Figure 2:
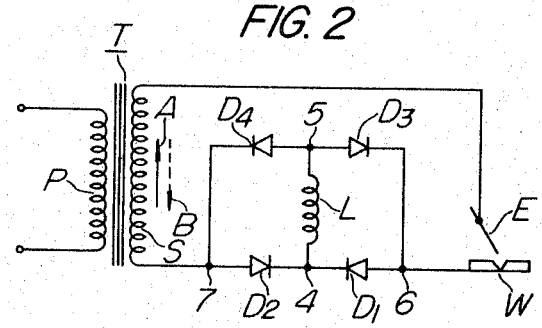
FIG. 2 is a circuit diagram showing an embodiment of the apparatus according to the present invention.

The conversion of the wave form of the current such as described above may actually be accomplished by disposing a current wave form converting apparatus comprising a bridge type full wave rectifier and a DC reactor in the welding current circuit. One embodiment of the apparatus according to the present invention will now be described with reference to the drawings. In FIG. 2, a welding leakage type transformer T is designed in such a manner that its external output characteristic represents a drooping characteristic, and the primary winding P of said transformer T is connected to an AC supply of 200 v. or 400 v. Rectifying elements $D_1$–$D_4$ constitute a bridge type full wave rectifier. Across DC side terminals 4 and 5 of said rectifier, there is connected a reactor L, while AC terminals 7 and 6 of said rectifier are connected to a welding electrode E through the secondary winding S of the welding transformer and a work piece W, respectively.

In performing a welding operation with said apparatus, an arc is produced between the electrode E and the work piece W. Then, the welding arc current flows through $D_1$–L–$D_4$ during the straight polarity half wave periods which are shown by an arrow A in FIG. 2 and the current flows through $D_2$–L–$D_3$ during the reversed polarity half wave periods which are shown by an arrow B. The current wave form on the DC side of a single phase full wave rectifier in which a reactor is connected on the DC side is well known and shown in FIG. 3 by a thick line 8. A thin line 9 represents a wave form of the full wave rectified current which is supplied from the AC supply. During an interval between P and Q, the current wave form 8 on the DC side of the rectifier is conformable with the full wave rectified current wave form 9, and the reactor stores energy during this interval. During the interval between Q and R or an energy discharging period, the current will continue to flow due to the discharging of the stored energy from the reactor L.

Figure 4:

Since the current due to the discharging of the stored energy from the reactor passes through the closed loops of $D_1$–L–$D_3$ and $D_2$–L–$D_4$ in FIG. 2, it will appear that the reactor L is in a short circuited condition due to the rectifying elements $D_1$–$D_4$ during the interval between Q and R so that the arc current value may be restricted mainly by the impedance of the power supply comprising the leakage inductance of the welding transformer and may not be affected by the reactor L. On the other hand, during an energy storing period of the reactor L between P and Q, the arc current flows to the reactor L through the rectifying elements $D_1$, $D_4$ or $D_2$, $D_3$ and the current value may be restricted by both said impedance of the power supply and the inductance of the reactor L. Thus, when the inductance value of the reactor L is selected relatively large compared to the impedance of the power supply, the instantaneous value of the current will change abruptly in the vicinity of the null instantaneous value of the arc current between Q and R and the increase in the current is suppressed by the function of the reactor L in the vicinity of the maximum current value between P and Q so that the crest value of the arc current may be suppressed relative to the case without the reactor L. As a result, a trapezoidal wave such as shown, for example, by the solid line 10 in FIG. 4 is obtained as the wave form of the welding current. Briefly speaking, the crest value of the current is lowered due to the energy absorption of the reactor L in the vicinity of the maximum value of the arc current, while the changing rate of the current is enhanced due to the energy release of the reactor L in the vicinity of the null instantaneous value of the current. The wave form tends to approximate a square wave as the reactor L is made larger. Thus, the arc is made stable as described before, thereby facilitating the welding operation and permiting a homogeneous welding. Furthermore, in AC arc welding employing a fusible electrode such as a covered welding eletrode, a neat welding bead with less sputtering is obtainable. One example of the welding conditions in which a wearing electrode is used is shown in the following table.

| | |
|---|---|
| Welding electrode | Low hydrogenous covered electrode for annealed steel (made by Kobe Seiko Ltd. under the trade name of LB–26). |
| Work piece | Annealed steel plate. |
| Arc voltage | 25 v. (open circuited voltage is 71 v.). |
| Welding current | 100 A. |
| Rectifier | 4 silicon controlled rectifier elements connected in a bridge type. |
| DC reactor | 4 mh. with iron core. |

It has also been found that by applying said apparatus in the welding of light metals or light alloys with a non-consumable electrode, better results are obtainable relative to the prior art. In the case where AC arc welding of light metals such as aluminum or light alloys is effected in an atmosphere of inert gas, it is a well known phenomenon that the arc current value of the straight polarity half wave is larger than the arc current value of the reversed polarity half wave based upon the inequality of the arc voltage due to the polarity so that a current of DC component flows. Then, the cleaning action by the reversed polarity arc which is necessary for the welding of such light metals becomes insufficient so that the stability of the arc is also deteriorated. One of the features according to the present invention is to improve this drawback. According to the present invention, the arc welding employing a welding apparatus such as shown in FIG. 2 is effected in such a manner that an AC arc is produced between a welding electrode E consisting of non-consumable material such as tungsten and a work piece W and inert shield gas such as argon is circulated about the arc in a well known manner so that the arc welding is effected in this shield gas.

Measured examples of the wave forms concerning the arc voltage and the arc current for the case where the welding is performed using the apparatus of the present invention are shown in FIGS. 5a and 6a, said apparatus having a rating output of 150 A and being constituted by combining a full wave rectifier and an iron-core DC reactor with a welding transformer in the manner that is shown in FIG. 2. Wave forms of the arc voltage and the arc current for the case where the welding is performed by using a conventional AC arc welder having a rating output of 180 A are shown in FIGS. 5b and 6b.

Welding conditions and DC current components for these cases are shown in the following tables for the sake of a comparison.

MEASURED EXAMPLE 1

[See FIGS. 5a and b]

|  | (a) Present invention | (b) Prior art |
| --- | --- | --- |
| Welding current (a.) | 30 | 30 |
| Arc voltage (v.) | 24-25 | 20-21 |
| Flux of argon gas (l./min.) | 8 | 8 |
| Diameter of tungsten electrode (mm.) | 1.0φ | 1.0φ |
| Material of work piece | Al | Al |
| Inductance of primary side (mH.) | 7 | |
| D.C. reactor (mH.) | 4 | |
| D.C. component of current (a.) | 8.5 | 22.5 |
| D.C. component of current (percent) | 28 | 75 |

MEASURED EXAMPLE 2

[See FIGS. 6a and b]

|  | (a) Present invention | (b) Prior art |
| --- | --- | --- |
| Welding current (a.) | 100 | 100 |
| Arc voltage (v.) | 21-22 | 17-18 |
| Flux of argon gas (l./min) | 8 | 8 |
| Diameter of tungsten electrode (mm.) | 1.6φ | 1.6φ |
| Material of work piece | Al | Al |
| Inductance of primary side (mH.) | 2.3 | |
| D.C. reactor (mH.) | 4 | |
| D.C. component of current (a.) | 25 | 53.5 |
| D.C. component of current (percent) | 25 | 53.5 |

As may be seen from these measured results, in the conventional method, the current is suppressed to flow during the half waves of reversed polarity due to a rectifying action of the electrode and the smaller the current, the crest value of the wave from becomes larger, and the wave form is more distorted, while according to the present invention, the DC current component, due to the unbalance of the arc current, is decreased relative to the conventional method and the wave form approximates a trapezoidal wave so that the cleaning action is effected sufficiently and the stability of the arc is enhanced, thereby permitting a good welding result. Although the reason why such a good result may be obtained is not clear, it may be considered that the increase in the current value is suppressed due to the function of the reactor L in the vicinity of the maximum value of the current as described with reference to FIG. 4 so that the crest value of the current is lower relative to the case without the reactor L and the degree of the depression of the crest value for the half wave of straight polarity in which the current value is inherently large is larger than that for the half wave of reversed polarity.

In the embodiment shown in FIG. 7, a welding apparatus for both AC and DC arc is constituted by connecting AC terminals 6 and 7 of the bridge type full wave rectifier consisting of rectifier elements $D_1$–$D_4$ in series with the secondary winding S of the welding transformer and the AC output terminals 11 and 12 of the welding apparatus and by connecting the reactor L and the DC output terminals 13 and 14 of the welding apparatus in series across the DC side terminals 4 and 5 of said rectifier.

Said AC output terminals 11 and 12 are connected to a welding electrode $E_1$ and a work piece $W_1$ through leads 15 and 16, respectively, and the DC output terminals 13 and 14 are connected to another welding electrode $E_2$ and another work piece $W_2$ through leads 17 and 18, respectively. There is provided a jumper 19 (or a switch) which is operable to short circuit either the terminals 11 and 12 or the terminals 13 and 14 selectively for the AC-DC switching. When said apparatus is used as an AC arc welding apparatus, the terminals 13 and 14 are short circuited by the jumper 19 and the AC output from the terminals 11 and 12 is supplied to the load $E_1$ and $W_1$. In this case, said apparatus is operated in a similar manner as the embodiment of FIG. 2. The crest value of the welding arc current passing through the welding circuit comprising the electrode $E_1$ and the work piece $W_1$ becomes lower than that of the sine wave due to the function of the full wave rectifier and the reactor, as described above, and the current takes a wave form of a square wave or a wave form approximating a square wave having a large changing rate of the current in the vicinity of the null instantaneous value of the current so that the production of a stable arc with little sputtering is permitted.

Figure 3:
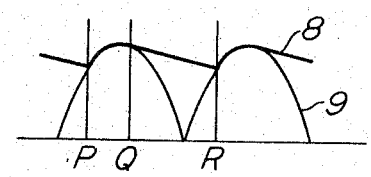
FIGS. 3 and 4 are the wave form diagrams of current passing through each part of the circuit when the AC arc welding is performed by using the apparatus of the invention with a fusible electrode.

When the terminals 11 and 12 are short circuited by the jumper 19 and a load including $E_2$ and $W_2$ is connected across the terminals 13 and 14, said apparatus may be operated as a DC arc welding apparatus of the single phase full wave rectifying type and a DC output with little pulsation, such as shown by a thick line 8 in FIG. 3, may be obtained due to the smoothing action of the reactor L connected on the load side of the full wave rectifier so that an extremely stable DC arc may be produced between the electrode $E_2$ and the work piece $W_2$.

Since an AC output by which a stable arc with little sputtering may be produced and a DC output with little pulsation may be derivable selectively from a single apparatus according to the present embodiment by means of a simple circuit switching, the apparatus may be adapted for use in various applications by selectively employing one of these two kinds of outputs suitable for the property and the configuration of the material to be welded so that there may be provided an AC and DC arc welding apparatus having excellent characteristic features being capable of performing a good welding in various cases.

It should be noted that the invention is not limited to the embodiment shown in the accompanying drawings and that various modifications may be made without departing from the spirit and the scope of the invention.

What is claimed is:

1. A method of arc welding in which an AC arc is produced between a welding electrode and a work piece, characterized by providing a current wave form converter comprising a bridge type full wave rectifier connected with its AC side terminals in series with the welding current circuit and a reactor connected between the DC side terminals of said rectifier, and characterized in that the welding current for sustaining said AC arc is supplied through said current wave form converter including the reactor, whereby the wave form of the welding current is shaped by the reactor to provide a square wave form or a wave form approximate to the square wave having a lower crest value than that of the sine wave and a large current changing rate in the vicinity of the null instantaneous value of the current.

2. A method of arc welding in which an AC arc is produced between a fusible welding electrode and a work piece characterized by providing a current wave form converter comprising a bridge type full wave rectifier connected with its AC side terminals in series with the welding current circuit and a reactor connected between the DC side terminals of said rectifier, and characterized in that the welding current for sustaining said AC arc is supplied through said current wave form converter including the reactor, whereby the wave form of the welding current is shaped by the reactor to provide a square wave form or a wave form approximate to the square wave having a lower crest value than that of the sine wave and a large current changing rate in the vicinity of the null instantaneous value of the current.

3. A method for effecting an arc welding of light metals or light alloys in which an AC arc is produced in the atmosphere of inert gas between a nonconsumable electrode and a work piece characterized by providing a current wave form converter comprising a bridge type full wave rectifier connected with its AC side terminals in series with the welding current circuit and a reactor connected between the DC side terminals of said rectifier, and characterized in that the welding current for sustaining said AC arc is supplied through said current wave form converter including the reactor, whereby the wave form of the welding current is shaped by the reactor to provide a square wave form or a wave form approximate to the square wave having a lower crest value than that of the sine wave and a large current changing rate in the vicinity of the null instantaneous value of the current so that the DC component of the welding current may be diminished.

4. An arc welding apparatus comprising a welding transformer having its primary winding connected to an AC power supply, a bridge type full wave rectifier, a reactor, means for connecting said reactor between the DC side terminals of said full wave rectifier, and means for connecting the AC side terminals of said full wave rectifier in series with the secondary winding of said welding transformer, a welding electrode and a work piece.

5. An AC and DC arc welding apparatus comprising a welding transformer having its primary winding connected to an AC power supply, a full wave rectifier having one set of diagonally opposite terminals called AC output terminals and a second set of diagonally opposite terminals called DC output terminals, at least two sets of a welding electrode and work piece, respectively, an inductive reactor, means for connecting the AC output terminals of said full wave rectifier, the secondary winding of the welding transformer, and one of the welding electrodes and associated work piece in series circuit relationship, means for connecting said reactor and the DC output terminals in series with the remaining welding electrode and its associated work piece, and means for selectively short circuiting either one or the other of the welding electrodes and its associated work piece.

References Cited
UNITED STATES PATENTS 2,777,973   1/1957   Steele et al. _____ 315—171

RICHARD M. WOOD, *Primary Examiner.*